United States

Gross

[11] 3,751,994

[45] Aug. 14, 1973

[54] OSCILLATORY SIGNAL SYSTEM WITH TURN ON AND TURN OFF RATE CONTROL

[75] Inventor: Alan E. Gross, Minnetonka, Minn.

[73] Assignee: MTS Systems Corporation, Minneapolis, Minn.

[22] Filed: Jan. 18, 1971

[21] Appl. No.: 107,343

[52] U.S. Cl............... 73/67.3, 73/71.6, 73/90, 328/160
[51] Int. Cl. ............................................. G01n 3/32
[58] Field of Search................. 73/67.3, 71.6, 90; 307/229; 318/611; 328/160, 163, 164

[56] References Cited
UNITED STATES PATENTS
3,516,413   6/1970   McDonald et al. ................. 328/160

Primary Examiner—Richard C. Queisser
Assistant Examiner—Arthur E. Korkosz
Attorney—Dugger, Peterson, Johnson & Westman

[57] ABSTRACT

A full scale oscillatory signal is multiplied by a ramp-type amplitude controlled rate signal to provide an output signal increasing linearly from zero volts to a full scale peak-to-peak value and then decreasing linearly back to zero. The rise portion of the ramp signal provides a controlled turn on rate for an oscillatory program command for material testing apparatus to avoid destruction of the specimen being tested, and the fall portion of the ramp signal provides a controlled turn off rate. Multi-channel test systems can be similarly controlled, only a single potentiometer being required for controlling the amplitude of all channels simultaneously.

26 Claims, 4 Drawing Figures

INVENTOR.
ALAN E. GROSS
BY
Dugger, Peterson, Johnson & Westman
Attorneys 3,751,994

OSCILLATORY SIGNAL SYSTEM WITH TURN ON AND TURN OFF RATE CONTROL

BACKGROUND OF THE INVENTION

1. Field of the Invention

This invention relates generally to a system for turning on and turning off an oscillatory signal at controlled rates, and pertains more particularly to turning on and off an oscillatory program command supplied to material test apparatus.

2. Description of the Prior Art

Vibration apparatus for determining the physical characteristics of a specimen, particularly the fatigue properties thereof, have been extensively used. The test specimen is placed in the apparatus and then vibrated artificially to produce the mechanical stresses and strains. Frequently, the oscillatory command signal is generated by a magnetic tape recorder. The shock developed from the sudden application of such an oscillatory signal at its full peak-to-peak value is acute, even causing destruction of the specimen in many instances. Previous attempts have used non-linear rates, which have been unpredictable as to the number of cycles required to obtain an accurate full scale or 100 percent peak-to-peak amplitude.

SUMMARY OF THE INVENTION

Accordingly, one general object of the present invention is to provide a system that will control the oscillatory signal so that the full value thereof will not be suddenly applied to the testing apparatus. More specifically, an aim of the invention is to provide a system for controlling both the turn on and turn off rates of an oscillatory signal that would otherwise be of sufficient magnitude to cause damage to the specimen to be tested.

Another object of the invention is to provide controlled turn on and turn off rates for an oscillatory signal with the turn off rate being faster than the turn on rate. While the invention will have especial utility in conjunction with vibration testing apparatus, it is envisaged that it may be found useful in other environmental situations.

Another object of the invention is to provide an amplitude control, so that the full scale value or magnitude of the oscillatory signal may be reduced when circumstances so dictate. In other words, if the oscillatory command signal is recorded at a given strength, the strength or value may be reduced when practicing the teachings of my invention. In this regard, an aim of the invention is to employ a single potentiometer which will serve to control the amplitude of a plurality of channels whether or not they are all subjected to an identical command signal or different command signals.

Yet another object is to provide circuitry of the foregoing character in which an integrator is utilized but which integrator does not hold the static level. Therefore, an aim of the invention is to obviate the adverse effect that integrator drift would cause. Stated somewhat differently, the integrator is used only during the turn on and turn off periods, being switched out of the circuit during the remainder of the time. Consequently, a further desideratum is to eliminate contact bounce, that is switching transients, when operating the Run-Stop contacts which would normally occur with mechanical switches.

Still further, an object of the invention is to provide a dynamic command that once the turn on period has been passed it will furnish an accurate peak-to-peak control. An aim of the invention in this regard is to provide a smooth transition from the ramping or turn on portion of the cycle to an accurate static level which is utilized during the actual testing of the specimen.

A still further object of the invention is to provide a control system of the foregoing character that will be quite simple and inexpensive to produce, yet highly reliable and long lasting in its operation. Therefore, the use of my system will be widely encouraged, both for utilization in vibration testing and also in other types of situations.

Briefly, the output from a direct current integrator is clamped at a certain negative voltage. When the Run-Stop contacts are operated to change one from a normally closed position to an open position and the other from a normally open position to a closed position the integrator changes polarity and the output therefrom starts to ramp with a positive slope. When the output of the integrator equals zero volts, the output of a zero crossing comparator changes its polarity state with the result that one field effect transistor is switched out and a second such transistor switched in. Although the integrator provides the amplitude controlled rate signal, which enables the dynamic command signal to reach its full scale magnitude, the rate at which this signal changes is influenced by the switching action. A third field effect transistor is then switched in and the second one switched out, so that the amplitude controlled rate signal equals whatever value the master amplitude control provides. By multiplying the amplitude controlled rate signal by the full scale oscillatory signal, the resulting or product signal is increased in magnitude during th upward ramping or rise portion of the amplitude controlled rate signal. The switching action, basically speaking, is reversed during the turn off period, this being after the testing operation has been completed.

DESCRIPTION OF THE PREFERRED EMBODIMENT

Figure 1:
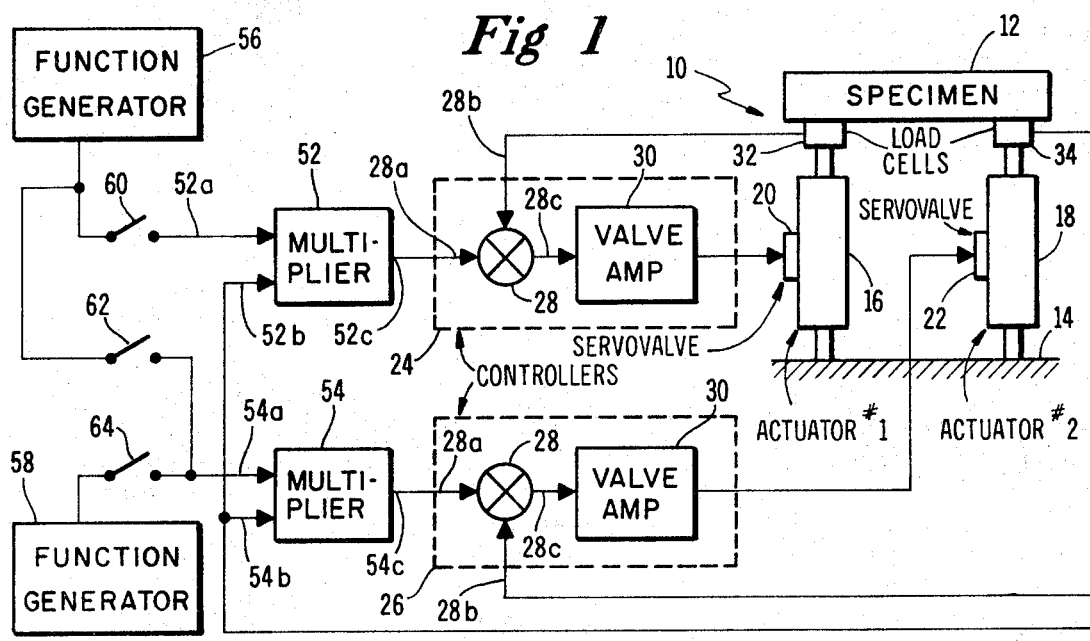
FIG. 1 is a combined block and schematic diagram illustrating my control system when used with vibration testing apparatus.
Figure 1:
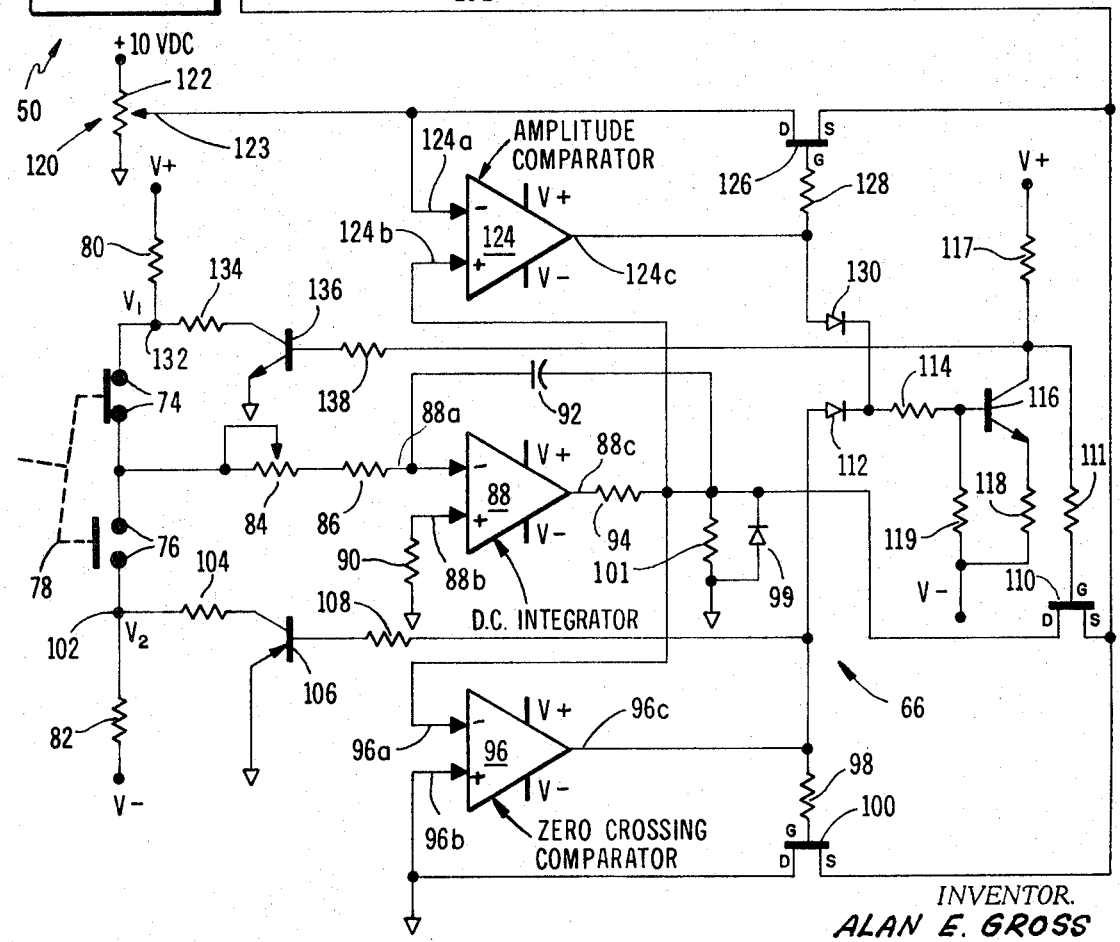

Referring first to FIG. 1, exemplary vibration testing apparatus has been designated generally by the reference numeral 10. A specimen 12 has been shown and constitutes whatever item is to be subjected to vibrations so that its properties can be ascertained. For instance, it might be an airplane wing. The illustrative testing apparatus 10 is supported on a rigid body or floor 14. Actually, the apparatus 10 comprises two actuators 16 and 18 in the present instance, the actuator 16 applying vibratory stresses to one portion and the actuator 18 to a second or spaced portion. The actuator 16 has a servovalve 20 associated therewith, and the second actuator 18 has a similar servovalve 22 associated therewith. Supplying fluid to the servovalve 20 is a controller 24 and supplying fluid to the servovalve 22 is a controller 26. Each controller 24, 26 includes a summing junction or comparator 28 having inputs 28a and 28b plus an output 28c. As is typical, a valve amplifier 30 is also included in each of the controllers 24 and 26, the valve amplifier functioning to merely amplify the error or output signal appearing at the output 28c in each instance. By means of load cells 32 and 34, there is a feedback to the input 28b of each comparator 28. The actual oscillatory command signal is introduced into the controllers 24, 26 via the inputs 28a. It should be appreciated at this stage of the description that the signal introduced at the inputs 28a of the controllers 24, 26 is the signal that must be moderated or reduced in amplitude during the turn on and turn off period as will become better understood from the description presently to be given with respect to my control system.

It is felt that the above description of the testing apparatus 10 is more than adequate for an understanding of one practical application where my invention will be of benefit. However, if further details are desired, reference may be made to U.S. Pat. No. 3,442,120 titled "Servo Valve Controlled Hydraulic Resonant Machine," granted on May 6, 1969 to Max Russenberger et al.

The oscillatory signal system has been indicated generally by the reference numeral 50. Inasmuch as two actuators 16 and 18 have been illustrated, this serves as a basis for utilizing two control channels. Consequently, the system 50 in its exemplified form includes a pair of multipliers 52 and 54. Multipliers found satisfactory in actual practice are manufactured by Motorola Semiconductor Products Inc. and carry model designation MC 1595. For the sake of a simplified description of the system 50, the two inputs belonging to the multiplier 52 have been given reference numerals 52a and 52b, the output of this particular multiplier carrying reference numeral 52c. By the same token, the multiplier 54 has a pair of inputs 54a and 54b plus an output 54c. It will be appreciated that whatever signals are delivered to the two inputs of either multiplier will be multiplied together and the product thereof will appear as an output signal at the output 52c or 54c, as the case may be.

Inasmuch as the apparatus 10 requires a two-channeled command, the oscillatory program signals are supplied by two function generators 56 and 58. These generators 56 and 58 may be magnetic tape recorders or suitable oscillators. In order to provide versatility to the testing procedure, the function generators 56 and 58 can be connected so as to supply signals to either the testing machine 16 or 18. To impart this flexibility to the system, a trio of switches 60, 62 and 64 are employed. When the switches 60 and 64 are closed, the switch 62 then being open, it can be seen from FIG. 1 that the function generator 56 is connected directly to the input 52a of the multiplier 52, whereas the function generator 58 is connected directly to the input 54a of the multiplier 54. On the other hand, when the switch 64 is open, and the switches 60, 62 closed, then the function generator 56 is connected to both inputs 52a and 54b.

Figure 2:
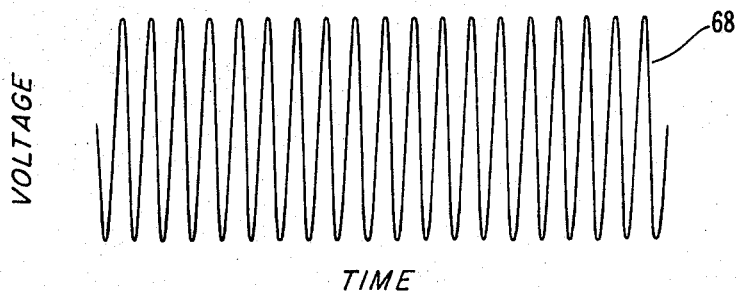
FIG. 2 shows a typical oscillatory command signal for the testing apparatus of FIG. 1 without turn on and turn off rate modification.

Also included in the system 50 is what will be termed amplitude controlled rate circuitry 66. Before describing in detail the circuitry 66, however, it will be well to refer to certain wave forms. In this regard, attention is first directed to the oscillatory signal 68 supplied by either the function generator 56 or the function generator 58. FIG. 2 is a graphical representation of this wave form, and it will be noted that the peak-to-peak amplitude is constant. It is this peak-to-peak value that can be injurious to the specimen 12, and the purpose of the present invention is to control the rate of turn on and also turn off. The amplitude controlled rate signal 70 is pictured in FIG. 3. This is a ramp-type signal and is composed of certain portions that will be dealt with in detail hereinafter. The resulting output signal 72 which reflects the controlled rate as far as the turn on and turn off periods are concerned is set forth in FIG. 4. Portions of this signal will be referred to in greater detail hereinafter.

At this time, the amplitude controlled rate circuitry 66 will be described. It will be observed that a set or normally closed contacts 74 are included and also a set of normally open contacts 76. These contacts 74, 76 are interlocked by means of a toggle mechanism 78 pictured only in phantom outline. It will be understood that when the toggle mechanism 76 is actuated so as to open the normally closed contacts 74, then the normally open contacts 76 will be at that time closed. More specifically, the contacts 74, 76 constitute Run-Stop contacts and the role performed by these contacts will become clear as the description progresses.

Attention is called to a positive supply voltage V$^+$, which in practice has been plus 16 VDC, and a negative supply of voltage V$^-$, which may be minus 16 VDC. One end of a resistor 80 is connected to the supply V$^+$ and the other end directly to the normally closed contacts 74. A second resistor 82 has one end connected to the negative supply voltage V$^-$ and its other end to the normally open contacts 76. The common or joined sides of the contacts 74 and 76 are connected through a potentiometer 84 and a fixed resistor 86 to a DC integrator 88, more specifically to its first input 88a. The integrator has a second input 88b and an output 88c. The input 88b is connected through a resistor 90 to ground so that a zero or common potential is applied to the input 88b. The DC integrator 88 can be a conventional operational amplifier, the integrating capabilities of which are well known when a feedback capacitor, such as that shown at 92, is employed. As is customary also, operational amplifiers invert the polarity of an input signal so that the output signal if of opposite polarity. This should be kept in mind during the ensuing description.

Connected to the output 88c of the integrator 88 is a resistor 94, the other end of which is connected to a zero crossing comparator 96, also an operational amplifier. The comparator 96 has a pair of inputs 96a and 96b plus an output labeled 96c. The output 96c is connected to a resistor 98 which in turn is connected to the gate of a field effect transistor 100 which functions as a first switch device to apply a certain potential (actually zero) to the inputs 52b, 54b when "closed," as will be better understood as the description progresses. The drain of the transistor 100 is connected directly to the input 96b of the zero crossing comparator 96. Both the input 96b and the drain of the transistor 100 are connected to ground. The source of the transistor 100 is connected to the inputs 52b and 54b of the multipliers 52, 54.

Figure 3:
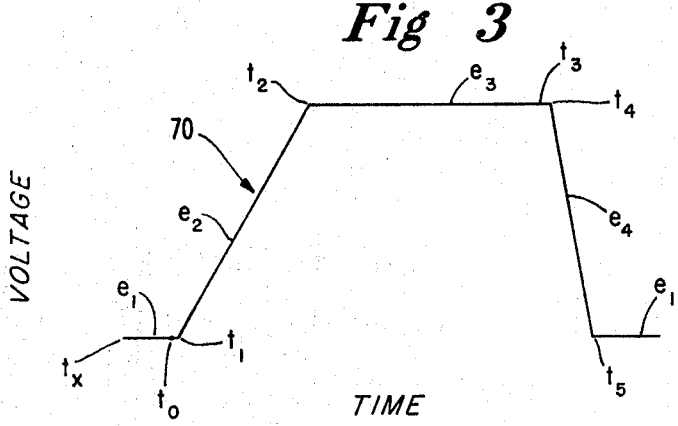
FIG. 3 shows a ramp-type amplitude controlled rate signal for gradually increasing and later decreasing the peak-to-peak value of the signal depicted in FIG. 2.
Figure 4:
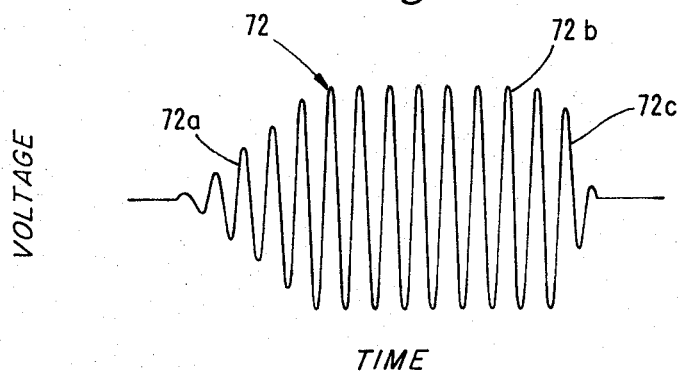
FIG. 4 shows the resulting output signal derived from a multiplication of the signals of FIGS. 2 and 3, the peak-to-peak magnitude increasing during the turn on period and decreasing during the turn off period.

It will be helpful to explain what takes place according to specific time intervals. At this stage of the description, it can be pointed out that the initial time period is represented by the period from $t_x$ to $t_0$ as far as the signal 70 of FIG. 3 is concerned. This period is an indefinite period, being really a stop condition period. In other words, the contacts 74 and 76 are in the condition or position that they appear in in FIG. 1. During the time $t_x$ to $t_0$, the output of the integrator 88 is saturated and clamped to a negative level because the input signal is a positive voltage through the normally closed contacts 74. More specifically, the electrical path can be traced from positive supply voltage $V^+$, the resistor 80, the contacts 74, the potentiometer 84, the fixed resistor 86 to the input 88a of the integrator 88. Whereas the input 88a has a positive voltage applied thereto, owing to the inversion of polarity by the integrator 88, the output is negative. The clamping action, however, is derived through the agency of a diode 99 having its anode connected to ground and its cathode connected to the previously mentioned resistor 94. A resistor 101 is connected in parallel with the diode 99. In other words, the forward bias of the diode 99 supplies the negative clamping action, more specifically −0.6 volts. An effort has been made to show this clamping voltage in FIG. 3.

The above action results in the same negative clamping voltage level being applied to the input 96a of the zero crossing comparator 96. Owing to the polarity inversion taking place in the comparator 96, the output of this comparator is saturated at a positive voltage. The positive voltage is applied to the gate of the transistor 100 through the previously referred to resistor 98, thereby turning on the transistor 100. Inasmuch as the drain of the transistor 100 is connected to ground, this applies a zero potential to the inputs 52a and 54a of the multipliers 52, 54. This zero voltage appears as $e_1$ in FIG. 3 and prevails during the initial period $t_x - t_0$. With the input signal impressed on the input 52b and the input 54b equal to zero volts, then it follows that the multiplication thereof with the full scale oscillatory signal 68 supplied by the function generator 56 or both generators 56 and 58 will produce a zero voltage output signal at the outputs 52c and 54c of the multipliers 52 and 54. Hence, no signal is delivered to the input terminals 28a of the comparators 28. Therefore the testing apparatus 10 remains inactive and no vibration is applied to the specimen 12 by the actuators 16, 18.

On the other hand, when the switch positions are reversed as far as the contacts 74 and 76 are concerned, then the contacts 74 are open and the contacts 76 closed. Graphically, this is from at $t_0$ in FIG. 3. The small amount of time from $t_0$ to $t_1$ is required to bring the output signal from the integrator 88 from its negative clamped voltage to zero voltage. It is at time $t_0$ that the input signal to the integrator 88 changes polarity by reason of the closure of the contacts 76 which applies a negative voltage from the negative supply $V^-$, doing so through the resistor 82. It will be understood that this causes the output signal from the integrator 88, that is the signal appearing at the output terminal 88c, to ramp from its negative value with a positive slope. This rise period is extremely small because the integrator 88 is ramping at a very fast rate. In this regard, it will be appreciated that the voltage identified as $V_2$ at the junction labeled 102 is virtually equal to the negative supply voltage $V^-$, as explained above. At this time, though, the amplitude controlled rate signal 70 remains at zero as is evident from FIG. 2, this being so because the field effect transistor 100 is still turned on, which in effect, connects the inputs 52a and 54a to ground owing to the switching function performed thereby.

The next period of time is from $t_1$ to $t_2$ as far as the signal 70 is concerned. This is defined as the turn on period when the output signal from the integrator 88 reaches zero volts, the output signal from the zero crossing comparator 96, that is the signal at its output 96c, will change state from positive saturation to negative saturation. This results in switching out the field effect transistor 100.

At this time, attention is called to a resistor 104 connected to the junction 102 and the collector of PNP transistor 106. The emitter of the transistor 106 is connected to ground, whereas the base of this transistor is connected through a resistor 108 to the previously mentioned resistor 98 having one end thereof connected to the gate of the field effect transistor 100 which acts as a second switch device. Up to this point, the transistor 106 remains in a nonconductive or off condition.

A second field effect transistor 110 has its drain connected to the resistor 94 extending from the output 88c of the integrator 88. The source of the field effect transistor 110, however, is connected directly to the inputs 52b and 54b of the multipliers 52 and 54. Before explaining the switching action that involves the field effect transistors 100 and 110, it will be well to describe the biasing arrangement for the transistor 110. Accordingly, there is a diode 112 having its anode connected to the output 96c of the zero crossing comparator 96. The cathode of the diode 112 has one end of a resistor 114 connected thereto, the other end of the resistor 114 being connected to the base of the NPN transistor 116, the collector of which is connected through a resistor 117 to the positive supply voltage $V^+$ and the emitter thereof being connected through a resistor 118 to the negative supply voltage $V^-$. A base resistor 119 extends also to the negative supply voltage $V^-$.

Consequently, when the zero crossing comparator 96 changes state from positive saturation to negative saturation the field effect transistor 100 is switched out and the transistor 110 switched in. In this regard, it will be observed that the output 96c is connected to the base of the transistor 116 and the increase of the base bias in a positive direction causes the transistor 116 to be turned off. This raises the potential in a positive direction that is applied to the gate of the field effect transistor 110 so that the transistor 110 is switched on.

Also, during this interval, the integrating rate of the integrator 88 is decreased, this being accomplished by decreasing the input voltage at junction 102. With the base bias applied through the resistor 108 under these conditions being of negative polarity, it follows that the PNP transistor 106 is turned on. However, by rendering the junction 102 less negative than before the transistor 106 is made conductive results in a less negative voltage being applied to the input 88a of the integrator 88. This accounts for a decrease in the integrating rate. The amplitude controlled rate signal 70 signal at the output 88c of the integrator 88 and inasmuch as the field effect transistor 110 is switched on at this time, the signal is impressed on the two input terminals 52b and 54b of the multipliers 52, 54. The multiplication taking place between the signal at the input terminals 52b, 54b and the oscillatory signal applied to the inputs 52a and 54a results in an output signal that is increasing as far as its peak-to-peak amplitude is concerned. The portion of the resulting output signal 72 that is provided by the positive-going ramp or during this time interval from $t_1$ to $t_2$ provides a positive ramp voltage indicated by $e_2$. This is derived from the output rise voltage $e_2$ has been indicated by the numeral 72a. Consequently, the portion 72a is impressed onto the inputs 28a of the comparators 28 and through the servovalves 20, 22 such a signal is delivered to the testing actuators 16, 18. In this way, a moderated vibratory load is applied to the specimen 12, being less than that which would be produced by the peak-to-peak amplitude of the signal 70 delivered by the function generator 56 or the generators 56, 58.

It is from the time $t_2$ to $t_3$ that the output signal 72 equals the full scale command. More specifically, this time portion of the signal has been indicated by the reference numeral 72b. This time interval is actually programmed by a master amplitude control labeled 120 which contains a potentiometer 122 having an adjustable wiper arm 123. By setting the wiper arm 123 the magnitude of a voltage applied to the input 124a of an amplitude comparator 124 can be adjusted. The amplitude comparator 124 is another operational amplifier, possessing the inversion capabilities of those already referred to herein. It has a second input 124b and an output 124c. The output 124c is connected to the gate of a third field effect transistor 126 through a resistor 128. It will be appreciated that the transistor 126 functions as still another switch device. The drain of this transistor 126 is connected to the wiper arm 123 of the potentiometer 122 and also to the input 124a of the comparator 124. The source, however, of the field effect transistor 126 is connected to the inputs 52b, 54b of the multipliers 52 and 54.

In addition to being attached to the resistor 128, the output 124c of the amplitude comparator 124 is connected to the anode of a diode 130, the cathode thereof being connected to the cathode of the previously mentioned diode 112 and the end of the resistor 114 that is attached to the cathode of the diode 112.

Consequently during the period extending from $t_2$ to $t_3$, the output signal from the amplitude comparator 124 is instrumental in switching the third field effect transistor 126 in and the second field effect transistor 110 out. The output from the integrator 88 continues to ramp toward positive saturation during this period. However, the amplitude controlled rate signal 70 during this interval equals the voltage supplied by the master amplitude control 120. This voltage in FIG. 3 has been denoted by the reference character $e_3$. Owing to the fact that the field effect transistor 110 has been switched out of the circuit, it is ineffectual as far as applying the output from the integrator 88 to either of the inputs 52b, 54b of the multipliers 52 and 54. The only signal that is applied to the inputs 52b and 54b at this time is through the third field effect transistor 126 which, as mentioned above, is applying the voltage provided by the positioning of the wiper arm 123 of the potentiometer 122, the potentiometer 122 actually constituting the master amplitude control denoted by the numeral 120.

It will be appreciated that the period extending from $t_2$ to $t_3$ is an indefinite one, depending upon the length of test as far as the specimen 12 is concerned. To terminate the testing operation, the toggle mechanism 78 associated with the contacts 74 and 76 is moved back to its stop position, thereby returning the contacts 74 to their normally closed position and the contacts 76 to their open position. This reverses the polarity applied to the input 88a of the integrator 88, for the closed contacts 74 apply a positive voltage derived from the positive supply voltage V$^+$. This causes the output signal from the integrator 88 to ramp with a negative slope. Whereas previously there was a rise to the output, it now is falling. This amount of time from $t_3$ to $t_4$ is quite small because the integrator 88 is ramping at a greater rate than during the turn on period from $t_1$ to $t_2$ and also at a greater rate than the turn off period which has not yet been referred to but which is from $t_4$ to $t_5$.

The section of the circuitry causing the faster ramping rate includes a junction 132 having a voltage $V_1$. The junction 132 is connected to one end of a resistor 134 and the other end of this resistor is connected to the collector of a NPN transistor 136. The emitter of the transistor 136 is connected directly to ground, whereas the base thereof is connected through a resistor 138 to the collector of the previously mentioned transistor 116 and also to the gate resistor 111 associated with the second field effect transistor 110. Due to the fact that the transistor 136 is off or nonconductive at this time, it will be appreciated that the voltage $V_1$ is equal to the positive supply voltage V$^+$. The amplitude controlled rate signal 70 during this period from $t_3$ to $t_4$ still equals the voltage supplied from the master amplitude control 120.

Passing now to the period $t_4$ to $t_5$, it will be recognized that this is the turn off period, because the dynamic command is decreasing at a linear rate during this interval. Consequently, when the output signal from the integrator 88 equals the master amplitude voltage $e_3$, the output signal from the amplitude comparator 124 changes state. This results in switching in the second field effect transistor 110 and switching out the third field effect transistor 126. It will be recognized that the transistor 110, being switched on, then applies the output signal from the integrator 88 to the inputs 52b and 54b of the multipliers 52 and 54.

It should be pointed out, though, that the integrating rate of the integrator 88 is decreased at the time $t_4$ by decreasing the input voltage $V_1$ at the junction 132. This is the responsibility of the transistor 136, for by turning on the transistor 136 the voltage $V_1$ at the junction 132 is decreased. In this regard, when the amplitude comparator 124 changes state as far as its output 124c is concerned, then at the same time that the field effect transistor 126 is switched out of the circuit, the bias applied to the base of the transistor 136 is increased in a positive direction to cause conduction of this transistor. This is developed from the fact that the transistor 116 is turned off by the reversal of polarity as far as the output signal from the amplitude comparator 124 is concerned. At any rate, it should be obvious that the amplitude controlled rate signal 70 during the time interval from $t_4$ to $t_5$ provides a negative ramp labeled $e_4$ from the output of the integrator 88 to produce the portion 72c of the signal 72. The falling rate during the turn off period can be considerably faster than the turning on rate, and this is taken advantage of by means of the control exercised by the transistor 136 and the components associated therewith.

It is from time $t_5$ on, which can really be until $t_x$ is reached again in preparation for a second testing cycle, that the dynamic command equals zero volts which has been labeled $e_1$. This is so because the amplitude controlled rate signal equals zero volts as can be discerned from the right hand portion of the signal 70 presented in FIG. 3. What occurs is that the output from the integrator 88 falls to zero volts and this causes the zero crossing comparator 124 to switch in the first field effect transistor 100 and switch out the second field effect transistor 110. The output signal from the integrator 88 continues to ramp or fall to a negative 0.6 volts due to the clamping action of the diode 99 as already explained. The amplitude controlled rate signal 70 will remain at its zero level until the toggle mechanism 78 is again actuated so as to open the contacts 74 and to close the contacts 76. This would cause a repetition of what has already been described in the way of operation.

From the foregoing, the operation of my system has actually already been given in sufficient detail to make it understandable. It should be appreciated, though, that the system provides a linear controlled rate in contradistinction to previous approaches utilizing a nonlinear rate. As already pointed out, the nonlinear rate results in an unpredictable number of cycles being required to obtain a precision peak-to-peak amplitude. The integrator 88, it will be seen, does not remain in the circuit during the actual application of the full scale command signal. Instead, the integrator 88 is employed only during the turn on and turn off portions of the testing sequence, the integrator being switched out of the circuit during the remainder of the time by virtue of the switching out of the field effect transistor 110. All of the switching is done electronically by the field effect transistors 100, 110 and 126 to provide a smooth transistion from the ramp portions of the signal 70, both as to the rise and fall thereof. This additionally contributes to the accuracy of the static level involving the portion 72b of the resulting output command signal 72.

Recapitulating, the signals 68 and 70 are multiplied together to produce the signal 72. Inasmuch as the wave forms presented in FIGS. 2–4 were prepared by a strip chart recorder, in order to avoid any misunderstanding as to the amplitude of the product signal 72 appearing in FIG. 4 it should be explained that the Motorola multipliers 52 and 54 automatically divide by a constant factor of 10, thereby providing a product signal 72 only one-tenth the scale that would otherwise exist. Whether the factor is one, ten or any other number is unimportant to the invention, depending instead on practical considerations not herein involved.

Assuming that the function generators 56 and 58 provide different oscillatory signals, although the signal 68 may be regarded as exemplary, both of the switches 60 and 64 would be closed, whereas the switch 62 would be open. This would apply different signals to the inputs 52a and 54a. However, master amplitude control 120 then serves to apply the same signal 70 to both inputs 52b and 54b of the multipliers 52 and 54. Thus, the full scale oscillatory signals supplied by the function generators 56 and 58 will be effective as far as the vibration applied to the specimen 12 by the two actuators 16 and 18. Yet, only one master amplitude control 120 is used and also only one amplitude controlled rate circuit 66 is needed.

The function generator 56 by closing the switches 60 and 62, and opening the switch 64, can be caused to supply both of the inputs 52a and 54a with the function generator signal 68. This will result in the actuators 16 and 18 applying the same type of vibration to the specimens at the two spaced locations.

While two channels have been alluded to, it will be appreciated that any number of channels can be controlled by a single master amplitude control 120.

I claim:
1. A system for controlling the turn on rate of an oscillatory signal for a test apparatus including a reciprocating actuator connected to a specimen, comprising means for supplying an oscillatory signal to said actuator, the turn on rate of which is to be controlled to prevent damaging the specimen, means providing a ramp signal having a slope portion, and means for multiplying said signals together to provide an oscillatory output signal increasing in peak-to-peak amplitude in accordance with the rate of rise of said slope portion during a desired turn on time, means providing a steady state reference signal to said multiplying means when the ramp signal reaches a preselected value, and switch means to connect the multiplying means to the last mentioned means when the ramp portion reaches said preselected value.

2. The system as defined in claim 1 in which said ramp signal means also provides a second slope portion for controlling the turn off rate of said output signal, and means to disconnect the reference signal means from the multiplier and to connect said second slope portion of ramp signal means to said multiplying means when said means providing the reference signal is disconnected from said multiplying means.

3. The system as defined in claim 2 in which said first slope portion increases at a linear rate.

4. The system as defined in claim 3 in which said second slope portion decreases at a linear rate different rom said first slope portion.

5. The system as defined in claim 4 including means for adjusting the magnitude of said reference signal.

6. The system as defined in claim 5 including vibration testing apparatus connected to the output of said multiplying means so that said oscillatory output signal controls said apparatus.

7. A system for controlling the turn on rate of an oscillatory signal comprising means for supplying an oscillatory signal, the turn on rate of which is to be controlled, a multiplier having first and second inputs and an output, said signal supplying means being connected to said first input, first switch means connected to said second input for applying a zero potential signal thereto so that the product signal at said output is zero when said switch means is closed, an integrator for providing a positive slope signal during a given interval of time, second switch means connected between the output of said integrator and said second input, means for applying a signal to said integrator to cause said integrator to supply said positive slope signal, said last-mentioned means opening said first switch means and closing said second switch means to apply said positive slope signal through said second switch means to said second input, and means for opening said second switch means when said positive slope signal reaches a predetermined magnitude and then applying a signal of said predetermined magnitude to the second input of said multiplier.

8. The system as defined in claim 7 including a constant potential source for applying said predetermined magnitude signal.

9. The system as defined in claim 8 in which said source is a potentiometer.

10. The system as defined in claim 9 including vibration testing apparatus connected to the output of said multiplier so that said product signal is supplied to said testing apparatus during the interval when said positive slope signal is increasing and also during the succeeding interval when said constant potential signal is applied to said second input.

11. The system as defined in claim 7 in which said last-mentioned means includes a third switch means and a potentiometer for supplying a constant potential signal through said third switch means to said second input when said third switch means is closed, said last-mentioned means further including means for closing said third switch means when said positive slope signal reaches said predetermined magnitude.

12. The system as defined in claim 11 including vibration testing apparatus connected to the output of said multiplier so that said product signal is supplied to said testing apparatus.

13. The system as defined in claim 12 including means for causing said integrator to provide a negative slope signal, and means for causing said second switch means to close and said third switch means to open so that said negative slope signal is applied to said second input.

14. The system as defined in claim 13 including means for reclosing said first switch means and reopening said second switch means to again apply said zero potential signal to said second input.

15. The system as defined in claim 14 in which said vibration apparatus includes a pair of channels, one channel being supplied by the oscillatory output signal from the output of said first multiplier, a second multiplier having first and second inputs and an output, means for connecting said oscillatory signal supplying means to the first input of said second multiplier, means for connecting said first switch means to the second output of said second multiplier, the other of said pair of channels being connected to the output of said second multiplier.

16. The system as defined in claim 15 including additional means for supplying a second oscillatory signal, a first switch for connecting said additional means to the first input of said second multiplier, said means for connecting said oscillatory signal supplying means to the first input of said second multiplier including a second switch.

17. The system as defined in claim 16 including a third switch between said first oscillatory signal supplying means and the first input of said first multiplier.

18. A system for controlling the turn on rate of an oscillatory signal comprising a function generator for supplying an oscillatory signal, a multiplier having first and second inputs and an output, said first input being connected to said function generator, an integrator having an input and an output, means for connecting the input of said integrator to a voltage having one polarity, means for connecting the output of said integrator to the second input of said multiplier during one time period, means for disconnecting the output of said integrator from the second input of said multiplier during a second time period, and means for connecting a steady state signal to the second input of said multiplier during said second time period.

19. The system as defined in claim 18 including means for reconnecting the output of said integrator to the second input of said multiplier during a third time period, means for reversing the polarity of said voltage applied to the input of said integrator during said third time period, and means for disconnecting said steady state signal from the second input of said multiplier during said third time period, whereby the turn off rate of said oscillatory signal supplied by said function generator is also controlled.

20. The system as defined in claim 19 including vibration testing apparatus connected to the output of said multiplier so that the oscillatory signal from said function generator, which is supplied to said vibration testing apparatus from the output of said multiplier, is applied to said vibration apparatus at an increasing peak-to-peak rate during said first time period and removed from said vibration apparatus at a decreasing peak-to-peak rate during said third time period.

21. A system for controlling the turn on and turn off rate of an oscillatory signal used for testing including a reciprocating testing apparatus, said testing apparatus including a plurality of channels, first means for supplying a first oscillatory signal, second means for supplying a second oscillatory signal, means providing a ramp signal having a first slope portion having a rate of magnitude increase, a second slope portion having a rate of magnitude decrease and an intermediate portion of substantially constant magnitude, first multiplying means for multiplying said first oscillatory signal and said ramp signal together to give a first output signal which has a peak to peak amplitude that varies as a function of said ramp signal, second multiplying means for multiplying said second oscillatory signal and said ramp signal together to deliver a second output signal which has a peak to peak amplitude that varies as a function of said ramp signal, and means connecting said first output signal to a first of said channels and said second output signal to a second of said channels.

22. The system as defined in claim 21 including means for connecting said first oscillatory signal supplying means to said second multiplying means in addition to being connected to said first multiplying means, and means for disconnecting said second oscillatory signal supplying means from said second multiplying means so that said first oscillatory signal supplying means supplies the same oscillatory signal to both multiplying means.

23. A command signal system for controlling the rate of increase of a first oscillatory command signal when said first command signal is initially supplied to a controlled device including a reciprocating actuator connected to a specimen comprising means for supplying a first oscillatory command signal to the actuator, means providing a second ramp command signal independent of the controlled device and having a ramp portion increasing at a selected ramp rate from a first level during a desired turn on time for said actuator, means for combining said signals and delivering a command output signal which has a rate of increase during said turn on time which is a function of the second ramp command signal, and means to provide a reference signal, switch means to disconnect the second ramp signal from the combining means and to connect the reference signal to the combining means when the ramp signal reaches a preselected level so that subsequent to the turn on time the command output signal varies as a function of the first command output signal and the reference signal.

24. The combination of claim 23 and control means for disabling said command output signal, said means providing said second ramp command signal including means providing a decreasing rate ramp signal portion decreasing from the reference level to said first level when the control means for disabling said command output signal is actuated.

25. A system for controlling the turn on and turn off rate of a signal controlling a loading apparatus comprising a multiplier having first and second inputs and an output, a function generator for applying a relatively constant peak-to-peak oscillatory signal to the first input of said multiplier, and an amplitude controlled rate circuit independent of the load applied by the loading apparatus for applying a ramp-type signal to the second input of said multiplier, said amplitude controlled rate circuit including a direct current integrator having first and second inputs and an output, said integrator inverting the polarity of an input signal so that the output signal is of opposite polarity and the second input thereof being connected to a zero reference potential, means for first applying a positive potential to the first input of said integrator, means clamping the output of said integrator to a negative potential while said positive potential is applied to the first input of said integrator, a zero crossing comparator having first and second inputs and an output, said zero crossing comparator inverting the polarity of an input signal so that the output signal is of opposite polarity and said clamping means also applying said negative potential to the first input of said zero crossing comparator and said second input of said zero crossing comparator being connected to said zero reference potential, a first field effect transistor having its gate connected to the output of said zero crossing comparator, its drain connected to said zero reference potential and its supply to the second input of said multiplier so that a positive potential is initially applied to the gate of said field effect transistor to turn on said field effect transistor and thereby apply said zero reference potential to the second input of said multiplier with the consequence that the product signal supplied at the output of said multiplier is zero, means for reversing the polarity applied to the first input of said integrator to a negative potential to provide a positive ramp potential to the output of said integrator to cause the signal at the output thereof to change to a negative potential to switch out said first field effect transistor, a second field effect transistor having its drain connected to the output of said integrator and its supply connected to the second input of said multiplier, means responsive to the means for applying a negative potential to the first input of said integrator to apply a positive potential to the gate of said second field effect transistor to turn on said second field effect transistor and thereby apply said positive ramp potential from said integrator to the second input of said multiplier, an amplitude comparator having first and second inputs and an output, said amplitude comparator inverting the polarity of an input signal so that the output signal is of opposite polarity, means providing a constant positive potential, the first input of said amplitude comparator being connected to said constant positive potential and the second input thereof being connected to the output of said integrator, a third field effect transistor having its gate connected to the output of said amplitude comparator, its drain to said constant positive potential means and its supply to the second input of said multiplier so that the positive ramp potential from said integrator is applied to the second input of said amplitude comparator to provide a positive signal from the output of said amplitude comparator to the gate of said third field effect transistor to thus turn on said third field effect transistor and thereby apply said constant positive potential from said constant positive potential means to the second input of said multiplier, means connected to the output of said amplitude comparator for turning off said second field effect transistor, means for again applying said positive potential to the first input of said integrator to cause said integrator to ramp with a negative slope, and means responsive to said last-mentioned means for turning off said third field effect transistor and turning said second field effect transistor.

26. The system as defined in claim 30 in which said constant positive potential means includes a potentiometer.

* * * * *